US012570795B2

(12) United States Patent
Nakagawa et al.

(10) Patent No.: US 12,570,795 B2
(45) Date of Patent: Mar. 10, 2026

(54) POLYESTER RESIN AND METHOD FOR PRODUCING BLOW-MOLDED PRODUCT MADE OF POLYESTER RESIN

(71) Applicant: TOYOBO CO., LTD., Osaka (JP)

(72) Inventors: Satoru Nakagawa, Fukui (JP); Kosuke Uotani, Fukui (JP); Shinya Kanetaka, Osaka (JP)

(73) Assignee: TOYOBO CO., LTD., Osaka (JP)

( * ) Notice: Subject to any disclaimer, the term of this patent is extended or adjusted under 35 U.S.C. 154(b) by 584 days.

(21) Appl. No.: 17/913,045

(22) PCT Filed: Mar. 8, 2021

(86) PCT No.: PCT/JP2021/009005

§ 371 (c)(1),
(2) Date: Sep. 20, 2022

(87) PCT Pub. No.: WO2021/192962

PCT Pub. Date: Sep. 30, 2021

(65) Prior Publication Data

US 2023/0250228 A1 Aug. 10, 2023

(30) Foreign Application Priority Data

Mar. 26, 2020 (JP) ................................ 2020-056876

(51) Int. Cl.
*C08G 63/80* (2006.01)
*C08G 63/692* (2006.01)

(52) U.S. Cl.
CPC ........... *C08G 63/692* (2013.01); *C08G 63/80* (2013.01)

(58) Field of Classification Search
CPC .... C08G 63/183; C08G 63/692; C08G 63/80; C08G 63/84; C08G 63/87; C08G 63/916;
(Continued)

(56) References Cited

U.S. PATENT DOCUMENTS 6,020,421 A * 2/2000 Fukushima ............ C08G 63/86
524/706
2004/0058805 A1* 3/2004 Nakajima ................. D01F 6/62
502/154
(Continued)

FOREIGN PATENT DOCUMENTS

JP 2003206336 * 7/2003
JP 2004-256633 9/2004
(Continued)

OTHER PUBLICATIONS

WO 2015194526 Togawa reference translation publication—Dec. 23, 2015.*
(Continued)

*Primary Examiner* — Heidi R Kelley
(74) *Attorney, Agent, or Firm* — Wenderoth, Lind & Ponack, L.L.P.

(57) ABSTRACT

A method for producing polyester resin containing an ethylene terephthalate structural unit of not less than 85 mol %, the method comprising: a melt-polymerization step of continuously performing melt-polymerization in two or more polymerization vessels by using an aluminium compound and a phosphorus compound as a polymerization catalyst; and a solid phase polymerization step of performing solid phase polymerization after the melt-polymerization step, wherein a polymerization in a final polymerization vessel of the melt-polymerization step satisfies a condition represented by the following formula: 410≤T*RT*(P/Al)≤580, wherein T represents a temperature (° C.) in the final polymerization vessel, RT represents residence time (hour) in the final polymerization vessel, and P/Al represents a molar ratio of phosphorus element to aluminium element in the polyester resin.

11 Claims, 5 Drawing Sheets

(58) Field of Classification Search
CPC ...... B29C 2049/023; B29C 2949/0715; B29C 49/06
See application file for complete search history.

(56) References Cited

U.S. PATENT DOCUMENTS

| | | | | |
|---|---|---|---|---|
| 2009/0082529 | A1* | 3/2009 | Kageyama ............. | C08G 63/84 526/66 |
| 2012/0183761 | A1* | 7/2012 | Hamamoto ........... | B32B 27/205 521/182 |
| 2013/0267674 | A1 | 10/2013 | Kita et al. | |
| 2016/0237207 | A1* | 8/2016 | Ohashi ................. | C08G 63/672 |

FOREIGN PATENT DOCUMENTS

| | | | | |
|---|---|---|---|---|
| JP | 2006045456 | * | 2/2006 | |
| JP | 2007-211045 | | 8/2007 | |
| JP | 5299655 | | 9/2013 | |
| JP | 2014-205796 | | 10/2014 | |
| WO | WO-2015194526 A1 | * | 12/2015 | ....... B29C 49/42414 |

OTHER PUBLICATIONS

Office Action issued May 30, 2024 in Indian Patent Application No. 202247058370, with English-language translation.
Krishnan, et al., “Polyester resins” Polyesters and polyamides, Woodhead Publishing, 2008, pp. 3-40.
International Search Report issued Apr. 20, 2021 in International (PCT) Application No. PCT/JP2021/009005.

* cited by examiner

[Fig. 1]
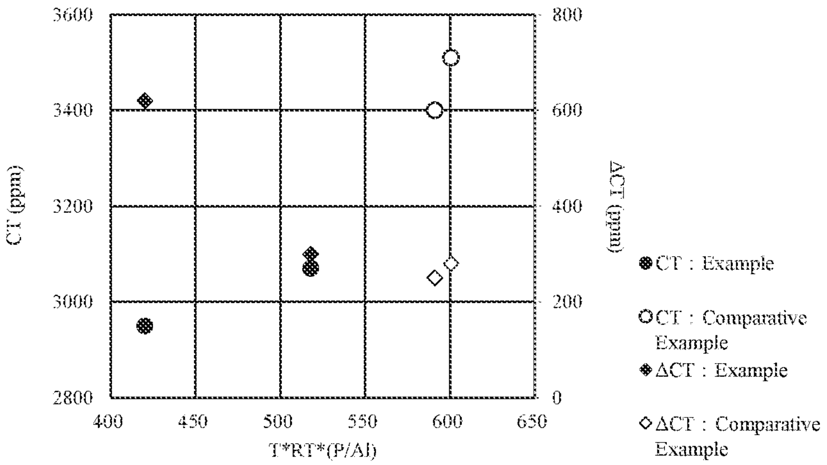

[Fig. 2]
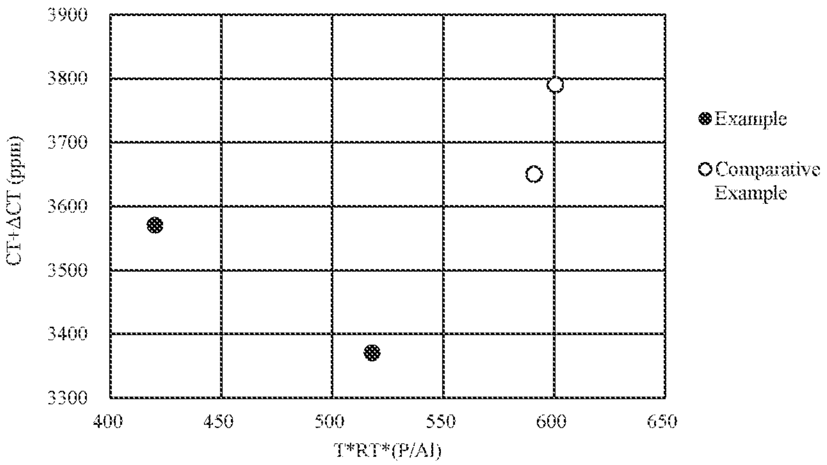

[Fig. 3]
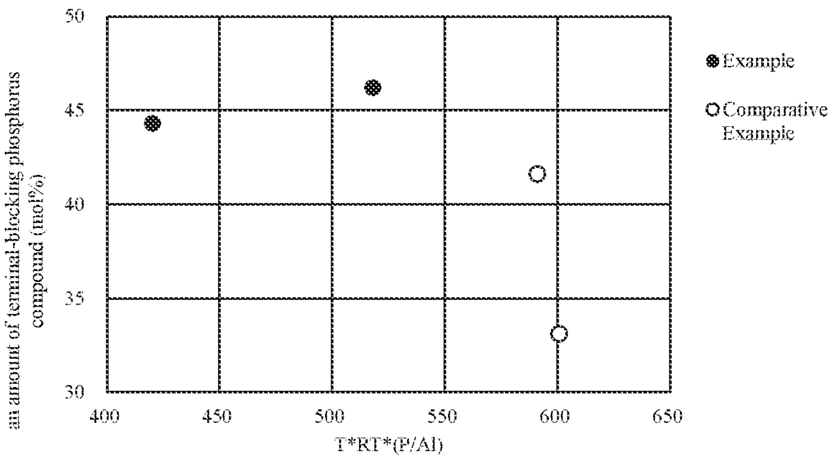

[Fig. 4]
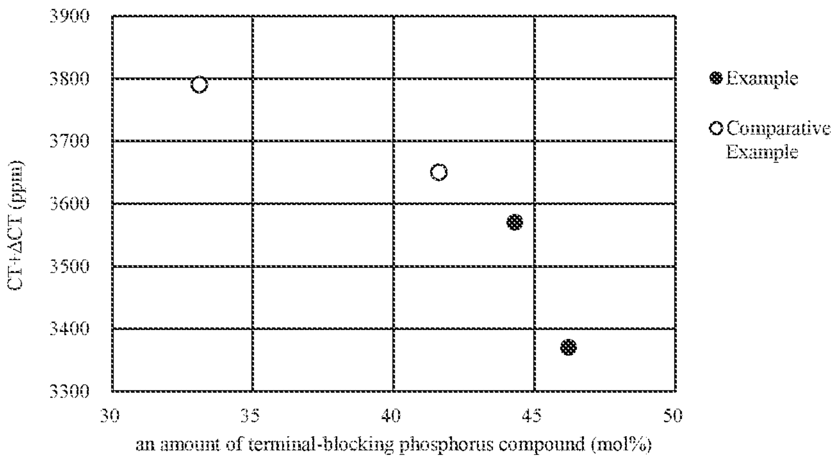

[Fig. 5]
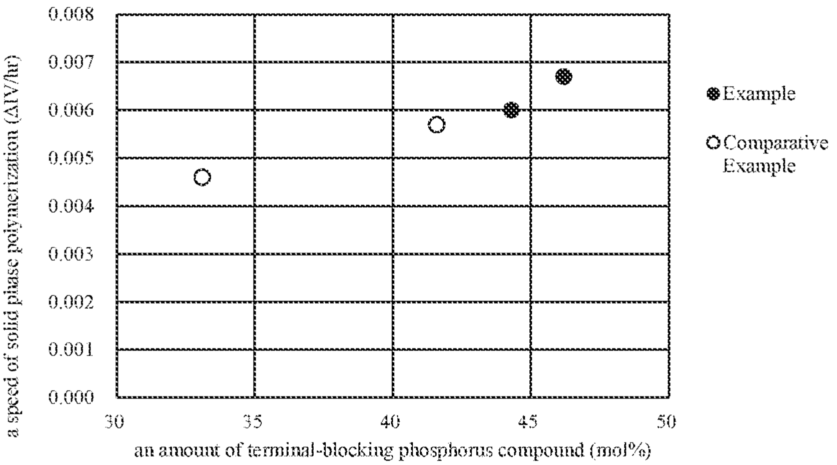

POLYESTER RESIN AND METHOD FOR PRODUCING BLOW-MOLDED PRODUCT MADE OF POLYESTER RESIN

TECHNICAL FIELD

The present invention relates to a polyester resin and a method for producing a blow-molded product made of the polyester resin.

BACKGROUND ART

A polyester resin typified by polyethylene terephthalate (PET), polybutylene terephthalate (PBT), polyethylene naphthalate (PEN), and the like has excellent mechanical characteristics and chemical characteristics, and is used in a wide range of fields, for example, for fibers for clothing and industrial materials, films and sheets for packaging, magnetic tapes, and optics, bottles as hollow molded products, casings for electric/electronic components, and other engineering plastic molded products, according to the characteristics of each polyester resin. Particularly, bottles made of saturated-polyester resin such as PET have excellent mechanical strength, heat resistance, transparency, and gas barrier properties, and are thus used widely as containers to be filled with drinks such as juice, carbonated drinks, and soft drinks, and containers for eye drops, cosmetics, and the like.

As a typical polyester resin, polyester resin containing, as a main structural component, a unit derived from aromatic dicarboxylic acid and alkylene glycol is produced by producing an oligomer mixture such as bis(2-hydroxyethyl) terephthalate through esterification or transesterification between ethylene glycol and terephthalic acid or dimethyl terephthalate, and melt-polymerizing the produced oligomer mixture by using a catalyst at a high temperature under vacuum, in the case of, for example, PET.

Conventionally, an antimony compound or a germanium compound has been widely used as a polyester polymerization catalyst that is used in the polymerization of such a polyester resin. Antimony trioxide as an example of an antimony compound is an inexpensive catalyst having excellent catalytic activity. However, when antimony trioxide is used as a main component, that is, when antimony trioxide is used in an amount sufficient to achieve a practical polymerization rate, metal antimony is deposited during polymerization, so that darkening and foreign matter occur on the polyester resin, which also causes surface defects of a film. Moreover, in the case where antimony trioxide is used as a raw material for a hollow molded product or the like, it is difficult to obtain a hollow molded product having excellent transparency. Due to such circumstances, a polyester resin that does not contain any antimony or contains no antimony as a catalyst main component is desired.

A germanium compound has already been put into practical use as a catalyst that is a catalyst other than an antimony compound, that has excellent catalytic activity, and that provides a polyester resin that does not have the above-described problems. However, a germanium compound has a problem that a germanium compound is very expensive, and a problem that since the catalyst is easily distilled out of the reaction system during polymerization, the catalyst concentration of the reaction system changes and it becomes difficult to control the polymerization, so that there is a problem when a germanium compound is used as a catalyst main component.

Polymerization catalysts that replace an antimony compound or a germanium compound have also been studied. Titanium compounds typified by tetraalkoxy titanates have already been proposed, but polyester resins produced using titanium compounds each have problems that the polyester resin is likely to be thermally deteriorated during melt molding and that the polyester resin is significantly colored.

Due to the above-described circumstances, a polymerization catalyst that contains a metal component other than an antimony, germanium, and titanium components as a main metal component and that has excellent catalytic activity and provides a polyester resin having excellent color tone and thermal stability and providing a molded product having excellent transparency, is desired.

One example of the usages of the polyester resin includes a blow-molded product. For a blow-molded product made of polyester resin, a molded product is required to have high transparency, and a catalyst formed of an aluminium compound and a phosphorus compound is disclosed as a novel polymerization catalyst (for example, see Patent Literature 1).

In a case where a catalyst formed of an aluminium compound and a phosphorus compound is used, generation of aluminium-based foreign substances needs to be inhibited in order to obtain polyester resin having high transparency. Patent Literature 2 discloses a method for inhibiting generation of aluminium-based foreign substances.

However, the method disclosed in Patent Literature 1 has a problem that transparency of the obtained polyester resin varies depending on added amounts of the aluminium compound and the phosphorus compound as a catalyst composition, and a composition ratio therebetween.

Meanwhile, in the method disclosed in Patent Literature 2, generation of aluminium-based foreign substances as described above as a problem can be inhibited, and polyester resin having high transparency and a blow-molded product made of the polyester resin can be obtained. However, in the blow-molded product made of the polyester resin, dirt is adhered to a mold used for molding due to a cyclic trimer (hereinafter, referred to as CT) contained in the polyester resin and a cyclic trimer (hereinafter, referred to as ΔCT) generated during molding, and a problem arises that, for example, transparency may deteriorate due to dirt on the mold in continuous molding.

CITATION LIST

Patent Literature

[PTL 1] Japanese Laid-Open Patent Publication No. 2004-256633

[PTL 2] Japanese Patent No. 5299655

SUMMARY OF THE INVENTION

Problems to be Solved by the Invention

The present invention has been made in view of the above-described problem of conventional art, and an object of the present invention is to exhibit, in a case where a polymerization catalyst that is formed of an aluminium compound and a phosphorus compound and that has, as a main metal component, a metal component other than antimony element, germanium element, and titanium element, is used, various stabilities of hue, heat resistance, and the like as characteristics of polyester resin obtained by using the polymerization catalyst, inhibit generation of aluminium-based foreign substances, exhibit high transparency, reduce both an amount of CT and an amount of ΔCT to inhibit a mold from being contaminated during production of a blow-molded product made of the polyester resin, and improve one of problems, in a method for producing the polyester resin by using a polymerization catalyst formed of an aluminium compound and a phosphorus compound, that a solid phase polymerization speed is low.

Solution to the Problems

The inventors of the present invention have found, as a result of thorough study for solving the aforementioned problem, a method for inhibiting contamination of a mold which is caused by CT and ΔCT during production of a blow-molded product made of polyester resin and which has not been overcome by conventional art, and enhancing the quality and productivity of the blow-molded product made of polyester resin, and have achieved the present invention.

An amount of CT and an amount of ΔCT described above antinomically behave. Therefore, the inventors of the present invention have attempted to establish a method for reducing both of CT and ΔCT, and reducing the total of amounts of the CT and the ΔCT to inhibit a mold from becoming dirty.

Patent Literature 2 discloses a method established by focusing on a specific structure of a phosphorus compound in polyester resin. Meanwhile, it has been found that nine kinds of phosphorus compounds including the structures on which Patent Literature 2 focuses exist as the phosphorus compounds in the polyester resin. The phosphorus compounds include phosphorus compounds that are bound to hydroxyl group terminals of polyester and that are represented below by chemical formula 1 to chemical formula 3.

Meanwhile, it is inferred that CT and ΔCT in polyester resin are generated by cyclic depolymerization of hydroxyl group terminals, that is, backbiting reaction in which a hydroxyl group terminal of the polyester as represented by the following chemical formula attacks the third ester bond counting from the terminal.

The inventors of the present invention have considered in the above-described circumstances that the backbiting reaction of the hydroxyl group terminals is inhibited and generation of CT and ΔCT can be inhibited by increasing amounts of the compounds represented by the above-described chemical formula 1 to chemical formula 3 and reducing the concentration of the hydroxyl groups in polyester resin, and made various examinations and completed the present invention. Furthermore, the inventors of the present invention have unexpectedly found through the above-described examination that a problem that, when a polyester polymerization catalyst formed of an aluminium compound and a phosphorus compound is used, solid phase polymerization activity is poor as compared with a case where an antimony catalyst is used, can also be improved.

The present invention has been completed based on the above-described findings, and includes the following configurations (1) to (10).

(1) A method for producing polyester resin containing an ethylene terephthalate structural unit of not less than 85 mol %, the method comprising:

a melt-polymerization step of continuously performing melt-polymerization in two or more polymerization vessels by using an aluminium compound and a phosphorus compound as a polymerization catalyst; and a solid phase polymerization step of performing solid phase polymerization after the melt-polymerization step, wherein a polymerization in a final polymerization vessel of the melt-polymerization step satisfies a condition represented by formula (I) indicated below.

$$410 \le T*RT*(P/Al) \le 580 \quad (I)$$

[in the formula (I), T represents a temperature (° C.) in the final polymerization vessel, RT represents residence time (hour) in the final polymerization vessel, and P/Al represents a molar ratio of phosphorus element to aluminium element in the polyester resin.]

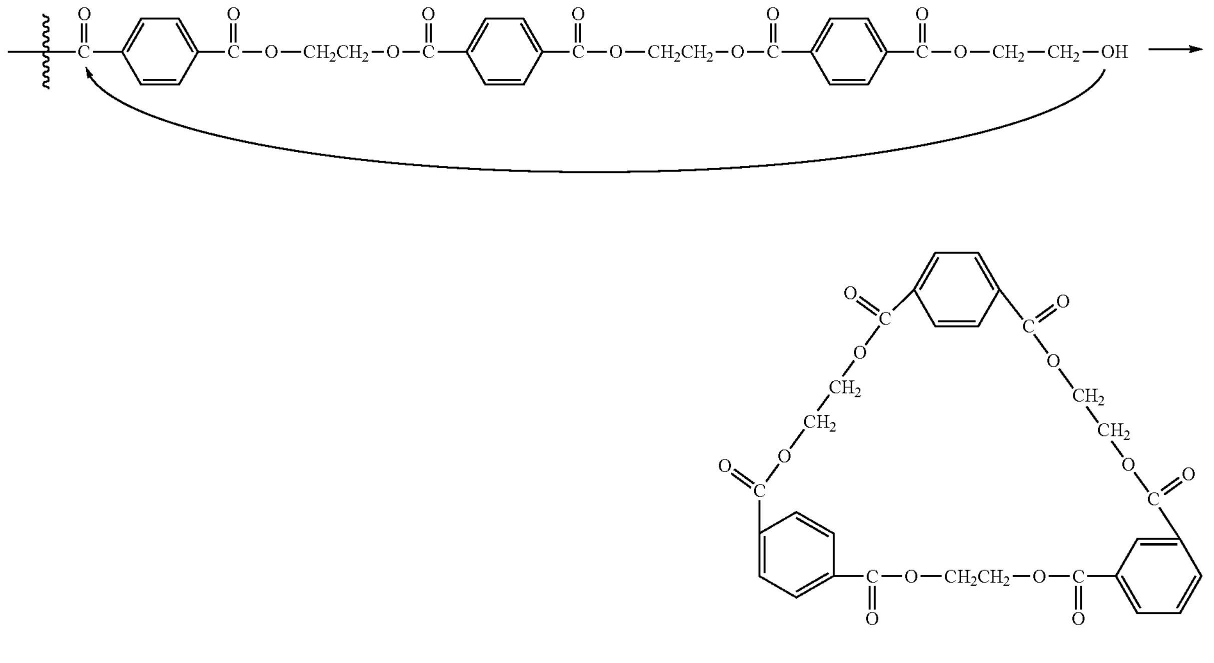

(2) The method for producing polyester resin according to the above (1), wherein the phosphorus compound is a phosphorus compound heated in a solvent at 150 to 200° C.

(3) The method for producing polyester resin according to the above (1) or (2), wherein the phosphorus compound is at least one selected from the group consisting of a phosphonic acid-based compound and a phosphinic acid-based compound.

(4) The method for producing polyester resin according to any one of the above (1) to (3), wherein a total amount of phosphorus element bound to a hydroxyl group terminal of polyester relative to a total amount of phosphorus element in the polyester resin, is 42 to 60 mol %.

(5) The method for producing polyester resin according to any one of the above (1) to (4), wherein an amount of a cyclic trimer of the polyester resin is not larger than 3300 ppm.

(6) The method for producing polyester resin according to any one of the above (1) to (5), wherein an amount of a cyclic trimer generated in melt-molding in which a moisture content of the polyester resin is not larger than 100 ppm and a temperature of a cylinder of an injection molding machine is 290° C., is not larger than 650 ppm.

(7) The method for producing polyester resin according to any one of the above (1) to (6), wherein a structure of a phosphorus compound bound to a hydroxyl group terminal of the polyester resin is at least one of structures represented by chemical formula 1 to chemical formula 3 indicated below.

chemical formula 1

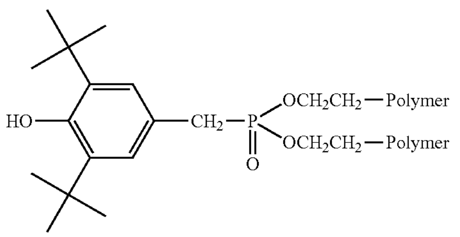

chemical formula 2

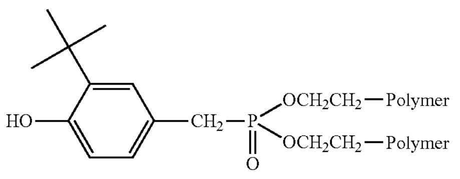

chemical formula 3

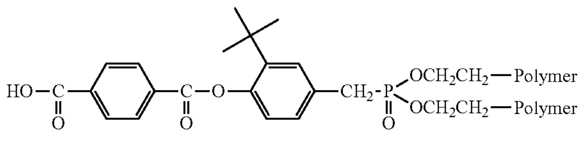

(8) The method for producing polyester resin according to any one of the above (1) to (7), wherein a content of aluminium element in the polyester resin is 13 to 25 ppm.

(9) The method for producing polyester resin according to any one of the above (1) to (8), wherein a molar ratio (P/Al) of phosphorus element to aluminium element in the polyester resin is 1.5 to 3.5.

(10) A method for producing a blow-molded product made of polyester resin, the method comprising performing blow-molding of the polyester resin produced in the method for producing polyester resin according to any one of the above (1) to (9).

Effect of the Invention

In the production method of the present invention, the polyester resin is obtained by using the polymerization catalyst that is formed of the aluminium compound and the phosphorus compound and that has, as a main metal component, a metal component other than antimony, germanium, and titanium, various stabilities of hue, heat resistance, and the like as characteristics of the polyester resin obtained by using the polymerization catalyst are exhibited, and, furthermore, generation of aluminium-based foreign substances is inhibited and transparency is made high. Moreover, in the production method of the present invention, a part of hydroxyl group terminals of the polyester is blocked by the phosphorus compound, generation of CT and ΔCT is inhibited in the step of producing the polyester resin and the molding step of blow-molding the polyester resin, so that an effect of inhibiting a mold for molding from being contaminated can be thus exhibited. In addition, a problem that, when a polyester polymerization catalyst formed of an aluminium compound and a phosphorus compound is used, solid phase polymerization activity is poor as compared with a case where an antimony catalyst is used, can also be unexpectedly improved.

BRIEF DESCRIPTION OF THE DRAWINGS

FIG. 1 is a diagram of the correlation between T*RT*(P/Al) in the final polymerization vessel, CT, and ΔCT obtained from the results of Examples and Comparative Examples.

FIG. 2 is a diagram of the correlation between T*RT*(P/Al) in the final polymerization vessel and the total amount of CT (=amount of CT+amount of ΔCT) obtained from the results of Examples and Comparative Examples.

FIG. 3 is a diagram of the correlation between T*RT*(P/Al) in the final polymerization vessel and an amount of the terminal-blocking phosphorus compound obtained from the results of Examples and Comparative Examples.

FIG. 4 is a diagram of the correlation between an amount of the terminal-blocking phosphorus compound and the total amount of CT (=amount of CT+amount of ΔCT) obtained from the results of Examples and Comparative Examples.

FIG. 5 is a diagram of the correlation between an amount of the terminal-blocking phosphorus compound and a speed of the solid phase polymerization obtained from the results of Examples and Comparative Examples.

MODE FOR CARRYING OUT THE INVENTION

The present invention will be described in detail below.

(Polyester Resin)

A polyester resin obtained by a production method of the present invention contains an ethylene terephthalate structural unit of not less than 85 mol %, more preferably not less than 90 mol %, and even more preferably not less than 95 mol %. The polyester resin obtained by the production method of the present invention is preferably made of polyvalent carboxylic acid and/or an ester-forming derivative thereof, and polyhydric alcohol and/or an ester-forming derivative thereof.

The polyvalent carboxylic acid is preferably a dicarboxylic acid, especially preferably a terephthalic acid, but dicarboxylic acids other than a terephthalic acid may be included. Examples of dicarboxylic acids other than terephthalic acid include: saturated aliphatic dicarboxylic acids such as oxalic acid, malonic acid, succinic acid, glutaric acid, adipic acid, pimelic acid, suberic acid, azelaic acid, sebacic acid, decane dicarboxylic acid, dodecane dicarboxylic acid, tetradecane dicarboxylic acid, hexadecane dicarboxylic acid, 1,3-cyclobutane dicarboxylic acid, 1,3-cyclopentane dicarboxylic acid, 1,2-cyclohexane dicarboxylic acid, 1,3-cyclohexane dicarboxylic acid, 1,4-cyclohexane dicarboxylic acid, 2,5-norbornane dicarboxylic acid, and dimer acid, or ester-forming derivatives thereof, unsaturated aliphatic dicarboxylic acids such as fumaric acid, maleic acid, and itaconic acid, or ester-forming derivatives thereof; and aromatic dicarboxylic acids such as orthophthalic acid, isophthalic acid, terephthalic acid, 5-(alkali metal) sulfoisophthalic acids, diphenic acid, 1,3-naphthalene dicarboxylic acid, 1,4-naphthalene dicarboxylic acid, 1,5-naphthalene dicarboxylic acid, 2,6-naphthalene dicarboxylic acid, 2,7-naphthalene dicarboxylic acid, 4,4'-biphenyldicarboxylic acid, 4,4'-biphenyl sulfone dicarboxylic acid, 4,4'-biphenyl ether dicarboxylic acid, 1,2-bis(phenoxy)ethane-p, p'-dicarboxylic acid, pamoic acid, and anthracene dicarboxylic acid, or ester-forming derivatives thereof.

In addition to a dicarboxylic acid, tri- or higher-valent carboxylic acids may be used in small amounts, and the tri- or higher-valent carboxylic acids is preferably tri- or tetra-valent carboxylic acids. Examples of polyvalent carboxylic acids include ethane tricarboxylic acid, propane tricarboxylic acid, butane tetracarboxylic acid, pyromellitic acid, trimellitic acid, trimesic acid, 3,4,3',4'-biphenyltetracarboxylic acid, and ester-forming derivatives thereof.

The polyhydric alcohol is preferably a diol, especially preferably an ethylene glycol, but diols other than an ethylene glycol may be included. Examples of diols other than ethylene glycol include: aliphatic glycols such as 1,2-propylene glycol, 1,3-propylene glycol, diethylene glycol, triethylene glycol, 1,2-butylene glycol, 1,3-butylene glycol, 2,3-butylene glycol, 1,4-butylene glycol, 1,5-pentanediol, neopentylglycol, 1,6-hexanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, 1,10-decamethylene glycol, and 1,12-dodecanediol, polyethylene glycol, polytrimethylene glycol, and polytetramethylene glycol; and aromatic glycols such as hydroquinone, 4,4'-dihydroxybisphenol, 1,4-bis(O-hydroxyethoxy)benzene, 1,4-bis(β-hydroxyethoxyphenyl)sulfone, bis(p-hydroxyphenyl)ether, bis(p-hydroxyphenyl)sulfone, bis(p-hydroxyphenyl)methane, 1,2-bis(p-hydroxyphenyl)ethane, bisphenol A, bisphenol C, 2,5-naphthalenediol, and glycols obtained by adding ethylene oxide to these glycols.

In addition to diols, tri- or higher-valent polyhydric alcohols or hydroxycarboxylic acids may be used in small amounts, and the tri- or higher-polyhydric alcohols are preferably tri- or tetra-valent polyhydric alcohols. Examples of the polyhydric alcohols include trimethylolmethane, trimethylolethane, trimethylolpropane, pentaerythritol, glycerol, and hexanetriol. Examples of hydroxycarboxylic acids include lactic acid, citric acid, malic acid, tartaric acid, hydroxyacetic acid, 3-hydroxybutyric acid, p-hydroxybenzoic acid, p-(2-hydroxyethoxy)benzoic acid, 4-hydroxycyclohexane carboxylic acid, or ester-forming derivatives thereof.

In addition to diols, cyclic esters may be also used. Examples of the cyclic esters include s-caprolactone. β-propiolactone, β-methyl-β-propiolactone, δ-valerolactone, glycolide, and lactide.

Examples of the ester-forming derivative of the polyvalent carboxylic acid or hydroxycarboxylic acid include alkyl esters and hydroxylalkyl esters of these compounds.

Examples of the ester-forming derivative of the polyhydric alcohol include ester of polyhydric alcohol and a lower aliphatic carboxylic acid such as acetic acid.

(Polymerization Catalyst)

The polyester resin obtained by the production method of the present invention is produced by using a polymerization catalyst formed of an aluminium compound and a phosphorus compound, and amounts of the aluminium compound and the phosphorus compound to be added may be a catalyst amount. The catalyst amount refers to an effective amount for progressing reaction between polyvalent carboxylic acid and/or the ester-forming derivative thereof, and polyhydric alcohol and/or the ester-forming derivative thereof. Specifically, the catalyst amount is required to be an amount that aluminium element and phosphorus element of predetermined amounts described below remain in the obtained polyester resin.

(Aluminium Compound)

The aluminium compound of the polymerization catalyst is not limited as long as the aluminium compound is dissolved in a solvent. Examples of the aluminium compound include: carboxylates such as aluminium formate, aluminium acetate, basic aluminium acetate, aluminium propionate, aluminium oxalate, aluminium acrylate, aluminium laurate, aluminium stearate, aluminium benzoate, aluminium trichloroacetate, aluminium lactate, aluminium citrate, aluminium tartrate, and aluminium salicylate; inorganic acid salts such as aluminium chloride, aluminium hydroxide, aluminium hydroxychloride, aluminium nitrate, aluminium sulfate, aluminium carbonate, aluminium phosphate, and aluminium phosphonate; aluminium alkoxides such as aluminium methoxide, aluminium ethoxide, aluminium n-propoxide, aluminium isopropoxide, aluminium n-butoxide, and aluminium t-butoxide; chelate compounds such as aluminium acetylacetonate, aluminium ethyl acetoacetate, and aluminium ethyl acetoacetate diiso-propoxide; organic aluminium compounds such as trimethylaluminium and triethylaluminium and partially hydrolyzed products thereof, reaction products formed of alkoxide of aluminium, an aluminium chelate compound, and hydroxycarboxylic acid; aluminium oxide; ultrafine particle aluminium oxide; aluminium silicate; and composite oxides of aluminium, and titanium, silicon, zirconium, an alkali metal, and/or an alkaline-earth metal. Among them, at least one selected from the carboxylates, the inorganic acid salts, and the chelate compounds is preferable. Among them, at least one selected from aluminium acetate, basic aluminium acetate, aluminium chloride, aluminium hydroxide, aluminium hydroxychloride, and aluminium acetylacetonate is more preferable, at least one selected from aluminium acetate, basic aluminium acetate, aluminium chloride, aluminium hydroxide, and aluminium hydroxy chloride is even more preferable, and at least one selected from aluminium acetate and basic aluminium acetate is most preferable.

The above-described aluminium compound is preferably an aluminium compound soluble in a solvent such as water or glycol. The solvent usable in the present invention is water and alkylene glycols. Examples of the alkylene glycols include ethylene glycol, diethylene glycol, triethylene glycol, propylene glycol, dipropylene glycol, tripropylene glycol, trimethylene glycol, ditrimethylene glycol, tetramethylene glycol, ditetramethylene glycol, and neopentyl glycol. At least one selected from ethylene glycol, trimethylene glycol, and tetramethylene glycol is preferable, and ethylene glycol is more preferable. A solution in which the aluminium compound is dissolved in water or ethylene glycol is preferably used in order to prominently exhibit the effect of the present invention. From the viewpoint of solubility, the aluminium compound is preferably at least one selected from aluminium acetate, basic aluminium acetate, aluminium chloride, aluminium hydroxychloride, and aluminium acetylacetonate, is more preferably at least one selected from aluminium acetate, basic aluminium acetate, aluminium chloride, and aluminium hydroxychloride, and is most preferably at least one selected from aluminium acetate and basic aluminium acetate.

An amount of the aluminium compound to be used is such an amount that an amount of aluminium element is preferably 13 to 25 ppm and more preferably 14 to 20 ppm with respect to the total mass of the obtained polyester resin. In a case where the amount of the aluminium element is less than 13 ppm, polymerization activity may be reduced. Meanwhile, in a case where the amount of the aluminium element is larger than 25 ppm, an amount of aluminium-based foreign substances may be increased.

(Phosphorus Compound)

Although the phosphorus compound of the polymerization catalyst of the present invention is not particularly limited, a phosphonic acid-based compound or a phosphinic acid-based compound is preferably used since an effect of enhancing activity of the catalyst is high. Among them, the phosphonic acid-based compound is more preferably used since the effect of enhancing activity of the catalyst is particularly high.

Among the above-described phosphorus compounds, a phosphorus compound having a phenol structure in the same molecule is preferable. Although the phosphorus compound is not particularly limited as long as the phosphorus compound has a phenol structure, one or more kinds of compounds selected from the group consisting of phosphonic acid-based compounds each having a phenol structure in the same molecule and phosphinic acid-based compounds each having a phenol structure in the same molecule is preferably used since an effect of enhancing activity of the catalyst is high, and one or more kinds of the phosphonic acid-based compounds each having a phenol structure in the same molecule is more preferably used since an effect of enhancing activity of the catalyst is very high.

Examples of the phosphorus compound having a phenol structure in the same molecule include compounds represented by $P(=O)R^1(OR^2)(OR^3)$ and $P(=O)R^1R^4(OR^2)$. $R^1$ represents a C1 to C50 hydrocarbon group containing a phenol moiety, or a C1 to C50 hydrocarbon group containing a phenol structure and a substituent such as a hydroxy group, a halogen group, an alkoxyl group, or an amino group. $R^4$ represents a hydrogen atom, a C1 to C50 hydrocarbon group, or a C1 to C50 hydrocarbon group containing a substituent such as a hydroxy group, a halogen group, an alkoxyl group, or an amino group. $R^2$ and $R^3$ each independently represent a hydrogen atom, a C1 to C50 hydrocarbon group, or a C1 to C50 hydrocarbon group containing a substituent such as a hydroxy group or an alkoxyl group. The hydrocarbon group may include a branched structure, an alicyclic structure such as cyclohexyl, or an aromatic ring structure such as phenyl or naphthyl. The terminal of $R^2$ and the terminal of $R^4$ may bind to each other.

Examples of the phosphorus compound having a phenol structure in the same molecule include p-hydroxyphenyl phosphonic acid, p-hydroxyphenyl phosphonic acid dimethyl, p-hydroxyphenyl phosphonic acid diethyl, p-hydroxyphenyl phosphonic acid diphenyl, bis(p-hydroxyphenyl) phosphinic acid, bis(p-hydroxyphenyl)phosphinic acid methyl, bis(p-hydroxyphenyl)phosphinic acid phenyl, p-hydroxyphenyl phenyl phosphinic acid, p-hydroxyphenyl phenyl phosphinic acid methyl, p-hydroxyphenyl phenyl phosphinic acid phenyl, p-hydroxyphenyl phosphinic acid, p-hydroxyphenyl phosphinic acid methyl, p-hydroxyphenyl phosphinic acid phenyl, and dialkyl 3,5-di-tert-butyl-4-hydroxybenzylphosphonate represented by chemical formula 4 described below. The phosphorus compound having a phenol structure in the same molecule is particularly preferably phosphorus compounds having hindered phenol structures, and, among them, dialkyl 3,5-di-tert-butyl-4-hydroxybenzylphosphonate represented by chemical formula 4 described below is preferable.

chemical formula 4

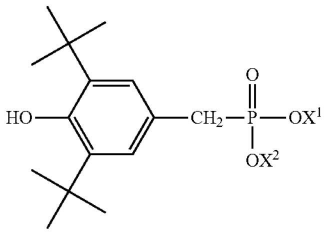

(In chemical formula 4, $X^1$ and $X^2$ each represent a hydrogen atom or a C1 to C4 alkyl group.)

The number of carbon atoms in the alkyl group represented by each of $X^1$ and $X^2$ is preferably 1 to 4 and more preferably 1 to 2. Particularly, an ethyl ester compound having two carbon atoms is preferable since the ethyl ester compound is commercially available as Irganox1222 (manufactured by BASF) and can be easily obtained.

An amount of the phosphorus compound to be used is such an amount that an amount of phosphorus element is preferably 25 to 60 ppm and more preferably 30 to 50 ppm with respect to the total mass of the obtained polyester resin. In a case where the amount of the phosphorus element is less than 25 ppm, polymerization activity may be reduced or an amount of aluminium-based foreign substances may be increased. Meanwhile, in a case w % here the amount of the phosphorus element is larger than 60 ppm, reduction of both of an amount of CT and an amount of ΔCT may become difficult, and increase of an amount of the phosphorus compound to be added may increase cost of the catalyst.

In the present invention, the above-described phosphorus compound is preferably a phosphorus compound having been subjected to heat treatment in a solvent. The solvent to be used is not limited as long as the solvent is at least one selected from the group consisting of water and alkylene glycol. As the alkylene glycol, a solvent in which the phosphorus compound is dissolved is preferably used, and a glycol such as ethylene glycol which is a component of the target polyester resin is more preferably used. The heat treatment in the solvent is preferably performed after the phosphorus compound has been dissolved. However, the phosphorus compound may not necessarily be completely dissolved for the heat treatment.

Although the temperature for the heat treatment is not particularly limited, the temperature is preferably 20 to 250° C. and more preferably 150 to 200° C.

A concentration of the phosphorus compound solution in the heat treatment is preferably 3 to 15 mass % and more preferably 5 to 15 mass %.

The heat treatment allows activity of the polymerization catalyst to be enhanced by using the aluminium compound in combination, and allows reduction of an amount of foreign substances generated due to the polymerization catalyst.

In the heat treatment, a part of the structure of 3,5-di-tert-butyl-4-hydroxybenzylphosphonic acid dialkyl ester used in the present invention, which is the phosphorus compound represented by chemical formula 4, is changed. For example, desorption of the t-butyl group, hydrolysis of the ethyl ester group, and change to a hydroxyethyl ester interchanged structure or the like occur. Therefore, in the present invention, examples of the phosphorus compound also include phosphorus compounds having structures changed as indicated in Table 1, as well as 3,5-di-tert-butyl-4-hydroxybenzylphosphonic acid dialkyl ester represented by chemical formula 4. An amount of a component of each phosphorus compound indicated in Table 1 in an ethylene glycol solution can be quantified by a P-NMR spectrum measurement method for the solution.

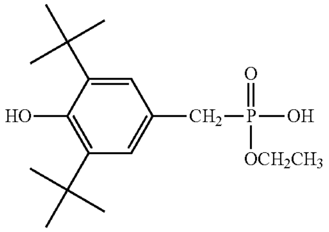

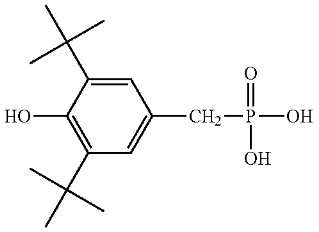

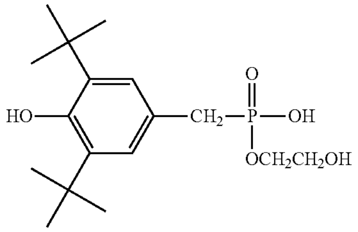

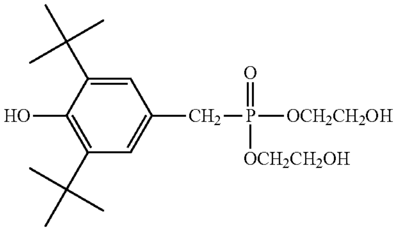

-continued

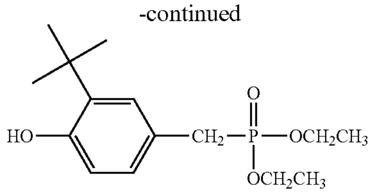

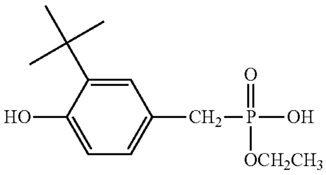

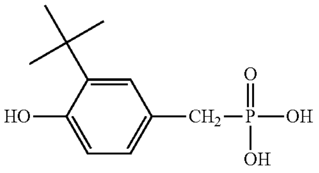

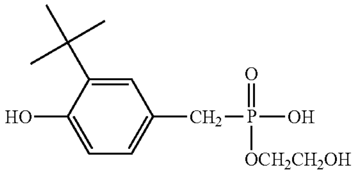

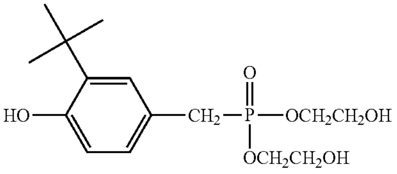

Therefore, examples of the phosphorus compound of the present invention include modified products of diethyl 3,5-di-tert-butyl-4-hydroxybenzylphosphonate, which are indicated above in Table 1, as well as diethyl 3,5-di-tert-butyl-4-hydroxybenzylphosphonate.

(Phosphorus Compound Structure in Polyester Resin)

The phosphorus compound exists, as nine kinds of structures including the three kinds of structures represented above by chemical formula 1 to chemical formula 3, in the polyester resin produced by using diethyl 3,5-di-tert-butyl-4-hydroxybenzylphosphonate and the modified products thereof. Table 2 indicates the nine kinds of the phosphorus compound structures. Also in a blow-molded product made of polyester resin which is described below, the nine kinds of the phosphorus compound structures indicated in Table 2 are included similarly to the polyester resin.

TABLE 2

| Phosphorus structure/ Phenol moiety structure | 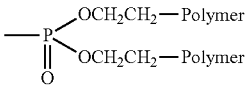 | 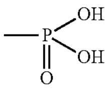 | 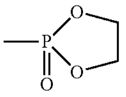 |
|---|---|---|---|
| 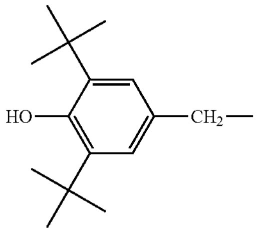 [SMILES: CCc1cc(C(C)(C)C)c(O)c(C(C)(C)C)c1] | chemical formula 1 | chemical formula 5 | chemical formula 8 |
| 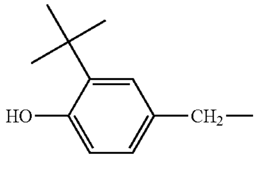 | chemical formula 2 | chemical formula 6 | chemical formula 9 |
| 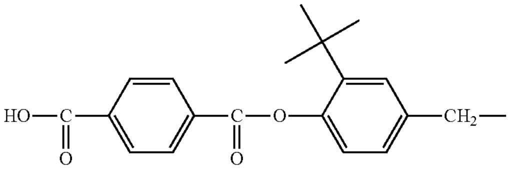 [SMILES: CCc1ccc(OC(=O)c2ccc(C(=O)O)cc2)c(C(C)(C)C)c1] | chemical formula 3 | chemical formula 7 | chemical formula 10 |

The technique disclosed in Patent Literature 2 is a technique established by focusing on chemical formula 5 and chemical formula 6 indicated above in Table 2.

As described above, the present invention is based on the idea that generation of CT and ΔCT can be inhibited by increasing the total amount of the phosphorus compound which is represented by chemical formula 1 to chemical formula 3 and bound to hydroxyl group terminals of polyester.

Therefore, in the present invention, preferably, 42 to 60 mol % of the total amount of phosphorus element in the polyester resin is bound to hydroxyl group terminals of the polyester, that is, the total amount of phosphorus element included in chemical formula 1 to chemical formula 3 with respect to the total amount of phosphorus element in the polyester resin is 42 to 60 mol %. The lower limit is more preferably not less than 44 mol % and a larger upper limit is more preferable and the upper limit may thus be 100 mol %. However, in view of technical difficulty, the upper limit is preferably 60 mol %, more preferably 55 mol %, and even more preferably 50 mol %. The phosphorus compound bound to hydroxyl group terminals of polyester may be referred to as terminal-blocking phosphorus compound.

Both an amount of CT and an amount of ΔCT can be reduced by satisfying the above-described range.

Although a polyester polymerization catalyst formed of an aluminium compound and a phosphorus compound has a problem that solid phase polymerization activity is poor as compared with an antimony catalyst, this problem can also be unexpectedly improved. Although the reason why increase of an amount of the polyester terminal-blocking phosphorus compound enhances solid phase polymerization activity is not clear, it is inferred that activity of reaction between hydroxyl group terminals and the terminal-blocking phosphorus compound in solid phase polymerization becomes higher than activity of reaction between carboxyl group terminals and the terminal-blocking phosphorus compound.

(Aluminium/Phosphorus Ratio in Polyester Resin)

In the polyester resin obtained by the production method of the present invention, a molar ratio (hereinafter, referred to as P/Al ratio) of phosphorus element to aluminium element is preferably 1.5 to 3.5. The lower limit is more preferably not less than 1.6. The upper limit is more preferably not larger than 3.0 and even more preferably not larger than 2.4. In a case where the P/Al ratio is less than 1.5, reduction of both an amount of CT and an amount of ΔCT becomes difficult, and an amount of aluminium-based foreign substances may be increased. Meanwhile, in a case where the P/Al ratio is larger than 3.5, reduction of both an amount of CT and an amount of ΔCT becomes difficult, and increase of an amount of the phosphorus compound to be added may increase cost of the catalyst. Furthermore, polymerization activity may also be reduced.

(Amount of CT in Polyester Resin)

An amount of CT that is contained in the polyester resin obtained by the production method of the present invention is preferably not larger than 3300 ppm. The amount of CT is more preferably not larger than 3200 ppm and even more preferably not larger than 3100 ppm. Although the lower limit is not limited, the lower limit is about 2500 ppm in view of technical difficulty. In a case where the amount of CT is larger than 3300 ppm, dirt on a mold may be disadvantageously increased during molding.

(Amount of ΔCT During Melt-Molding of Polyester Resin)

When melt-molding in which a moisture content of the polyester resin obtained by the production method of the present invention is not larger than 100 ppm, and the temperature of a cylinder of an injection molding machine is 290° C. is performed, an amount of ΔCT is preferably not larger than 650 ppm. The amount of ΔCT is more preferably not larger than 500 ppm and even more preferably not larger than 400 ppm. Although the lower limit is preferably 0 ppm, the lower limit is about 200 ppm in view of technical difficulty. In a case where the amount of ΔCT is larger than 650 ppm, dirt on a mold may be disadvantageously increased during the molding.

(Blow-Molded Product Made of Polyester Resin)

It is important that a blow-molded product of the present invention is a polyester-resin blow-molded product molded by using the above-described polyester resin. By using the above-described polyester resin, both an amount of CT and an amount of ΔCT can be reduced to reduce contamination of the mold during molding.

A method for producing the blow-molded product made of the polyester resin according to the present invention is not limited. For example, the production method includes a step of molding a preform, a step of crystallizing a plug portion, a step of re-heating the preform, a step of blow-stretching the re-heated preform in a mold, and a step of heat-setting, in a heated mold, a hollow molded product having been blow-stretched.

Hollow containers produced by blow-molding of the polyester resin such as PET, are used in various ways. Particularly, the hollow container is very frequently used as a container (bottle) for drinks such as juice, tea, and mineral water.

These drink containers are roughly classified into pressure-resistant bottles for carbonated drinks and the like, aseptic bottles to be aseptically filled, and heat-resistant bottles to be filled at a high temperature.

The heat-resistant bottle is filled with a filling material at a high temperature of about 80° C. and the bottle is thus required to have heat resistance so as not to be deformed at the filling temperature, and the bottle plug portion and barrel portion are crystallized to achieve the heat resistance.

In crystallization of the barrel portion, after a preform is heated, blow-stretching is performed in a mold having been heated to 130 to 180° C., and the bottle is further retained in the mold for about 0.5 seconds to about 10 seconds to enhance crystallization of the bottle barrel portion.

At this time, the oligomer such as CT in the polyester resin and ΔCT generated during the blow-molding transfers to the surface of the mold to contaminate the surface of the mold, and the contamination is accumulated by repeating the molding, so that the bottles obtained after a certain number of times of molding are clouded and have no commercial value. Therefore, the mold needs to be cleaned.

The mold needs to be manually wiped by using a solvent in order to clean the mold. A large-scale commercial blow-molding machine includes a plurality of molds for blow-molding. Therefore, several hours to one day are required until cleaning of all the molds is finished, and improvement is required from the viewpoint of reduction of productivity and operation environment.

Therefore, in the present invention, a content of cyclic trimers in the blow-molded product is preferably not larger than 3600 ppm and more preferably not larger than 3500 ppm. A smaller content of the cyclic trimers in the blow-molded product is preferable. However, the content is, for example, not less than 1000 ppm, preferably not less than 2000 ppm, and even more preferably not less than 2700 ppm in view of technical difficulty.

In the present invention, resin other than polyethylene terephthalate may be contained in order to improve crystallization characteristics of the polyester resin. The resin other than polyethylene terephthalate is, for example, preferably at least one resin selected from the group consisting of polyolefin resin, polyamide resin, polyacetal resin, and polybutylene terephthalate resin. A blended amount of the resin other than polyethylene terephthalate is preferably 0.1 ppb to 1000 ppm (by mass), more preferably 0.3 ppb to 100 ppm (by mass), even more preferably 0.5 ppb to 1 ppm (by mass), and particularly preferably 0.5 ppb to 45 ppb (by mass).

As a method for blending the above-described resin in the polyester resin, a method capable of uniformly mixing the resin such as a method of adding the resin during production of the polyester resin and a method of dry blending with the polyester resin having been produced is preferable, and the resin is preferably added during production of the polyester resin, specifically, during preparation of raw material slurry, at any of stages in esterification or transesterification, or at any of time points in initial stage of polymerization. A method in which polyester resin chips are brought into contact with a crystalline resin member is also preferable.

(Method for Achieving Reduction of Both an Amount of CT and an Amount of ΔCT)

In the present invention, an amount of the terminal-blocking phosphorus compound in the phosphorus compound existing in the polyester resin is preferably large in order to achieve both reduction of an amount of CT and reduction of ΔCT. Therefore, the method for producing the polyester resin according to the present invention includes a melt-polymerization step of continuously performing melt-polymerization in two or more polymerization vessels (polymerization reactors in which polycondensation after esterification/transesterification step is performed) by using the aluminium compound and the phosphorus compound as a polymerization catalyst, and causing polymerization in a final polymerization vessel to satisfy a condition represented by the following formula (I), and a solid phase polymerization step of performing solid phase polymerization after the melt-polymerization step. In the description herein. "polymerization vessel" refers to a polymerization vessel in which polycondensation after the esterification/transesterification step is performed.

$$410 \leq T^{*}RT^{*}(P/Al) \leq 580 \quad (I)$$

[In the formula (I), T represents a temperature (° C.) in a final polymerization vessel, RT represents a residence time (hour) in the final polymerization vessel, and P/Al represents a molar ratio of phosphorus element to aluminium element in the polyester resin.]

The terminal-blocking phosphorus compound is influenced by a product between a product of a temperature and a residence time in a final polymerization vessel in the melt-polymerization step for the polyester resin, and a molar ratio between phosphorus element and aluminium element remaining in the polyester resin. Therefore, in the present invention, the product of a temperature and a residence time in the final polymerization vessel is important in the above-described melt-polymerization step. The number of the polymerization vessels is more preferably 2 to 5, even more preferably 3 to 4, and most preferably 3.

The value of the formula (I) is more preferably not less than 420, even more preferably not less than 450, and particularly preferably not less than 500. The value of the formula (I) is more preferably not larger than 560 and even more preferably not larger than 530. In a case where the value of the formula (1) is larger than 580 or less than 410, the total of an amount of CT and an amount of ΔCT may be increased by reduction of an amount of the terminal-blocking phosphorus compound, and contamination of the mold may be increased in the case of the polyester resin being molded.

A method for producing the polyester resin according to the present invention is not particularly limited. For example, an oligomer of polyhydric alcohol and terephthalic acid or the like is obtained by direct esterification between polyhydric alcohol and polyvalent carboxylic acid containing terephthalic acid or transesterification between polyhydric alcohol and alkyl ester such as terephthalic acid, and is thereafter melt-polymerized under a normal pressure or a reduced pressure to obtain the polyester resin. At this time, an esterification catalyst or the polymerization catalyst can be used as necessary.

(Melt-Polymerization Step for Polyester Resin)

In the method for producing the polyester resin of the present invention by using the polymerization catalyst formed of the aluminium compound and the phosphorus compound, a composition of the polyester oligomer fed into the polymerization vessel exerts a larger influence as compared with a case where antimony, germanium, and titanium-based catalysts are used. Therefore, the following method is preferable.

The melt-polymerization step for the polyester resin according to the present invention can be performed by a method including conventionally known steps except that the polyester polymerization catalyst formed of the aluminium compound and the phosphorus compound is used as the catalyst, and the above-described melt-polymerization conditions and the P/Al (molar ratio) in the polyester resin are in specific ranges. For example, in a case where PET is produced, the PET is produced in direct esterification in which terephthalic acid and ethylene glycol, and, as necessary, other copolymerization components are caused to react directly with each other, water is distilled to perform esterification, and polymerization is thereafter performed under a reduced pressure, or in transesterification in which dimethyl terephthalate and ethylene glycol, and, as necessary, other copolymerization components are caused to react with each other, methyl alcohol is distilled to perform transesterification, and polymerization is thereafter performed under a reduced pressure. In order to promote crystallization before solid phase polymerization, the melt-polymerized polyester resin may be caused to absorb moisture, then heated, and crystallized, or may be heated and crystallized by spraying water vapor directly to polyester resin chips.

The melt-polymerization reaction is preferably performed by a continuous reaction device. In the continuous reaction device, the reaction vessel for esterification or transesterification and the melt-polymerization reaction vessel are connected by piping, and a raw material is continuously fed and transferred into the melt-polymerization reaction vessel through the piping, and resin is extracted from the melt-polymerization reaction vessel without causing each reaction vessel to become empty. In this case, continuous may not necessarily represent a state where feeding of the raw material up to extraction is fully constantly performed, and feeding of the raw material up to extraction may be intermittently performed in small amounts, for example, in an amount corresponding to about 1/10 of the volume of the reaction vessel.

In any of the methods, the esterification or the transesterification may be performed in one stage or divided into multiples stages, and is preferably performed in 2 to 5 stages, more preferably performed in 3 to 4 stages, and even more preferably performed in 3 stages.

In the present invention, a set value of a concentration of carboxyl terminal groups of the polyester oligomer fed in the polymerization step is preferably 800 to 1500 eq/ton and more preferably 800 to 1450 eq/ton. In a case where the set value of the concentration of carboxyl terminal groups of the polyester oligomer is in the above-described range, activity of the polymerization catalyst can be sufficiently extracted.

In the present invention, a proportion of the concentration of hydroxyl terminal groups to the concentration of the entire terminal groups in the polyester oligomer fed in the polymerization step is preferably 45 to 70 mol % and more preferably 47 to 68 mol %.

In a case where the concentration of carboxyl terminal groups of the oligomer fed in the polymerization step is in the above-described preferable range, the concentration of the carboxyl terminal groups fluctuates preferably in a range of the set value±6%, more preferably in a range of the set value±5%, even more preferably in a range of the set value±4%, and particularly preferably in a range of the set value±3%. In a case where the concentration of the carboxyl terminal groups fluctuates outside the range of the set value±6%, uniformity in quality of the obtained polyester resin may be reduced. Meanwhile, although the lower limit is most preferably the set value±0% indicating that the concentration does not fluctuate, the concentration fluctuates preferably in a range of the set value±0.2% and more preferably in a range of the set value±0.5% from the viewpoint of cost performance.

For example, in a case where the esterification is performed by using a plurality of esterification vessels, reduction of fluctuation of the concentration of carboxyl terminal groups of the polyester oligomer at a first esterification vessel outlet is important in order to reduce fluctuation of the concentration of carboxyl terminal groups of the polyester oligomer at a final esterification vessel outlet as an oligomer to be fed in the polymerization step. By reducing the fluctuation of the characteristics, the fluctuation of the concentration of the carboxyl terminal groups of the polyester oligomer at the final esterification vessel outlet can be extremely reduced. Furthermore, the fluctuation of the concentration of the carboxyl terminal groups of the polyester oligomer at the first esterification vessel outlet is greatly influenced by fluctuation of a heat amount, per unit time, of a reaction product retained in the first esterification vessel. Therefore, the fluctuation of the heat amount is preferably controlled so as to be in an appropriate range.

That is, in a method in which slurry formed of dicarboxylic acid and glycol is prepared in a slurry preparation vessel, is continuously fed into the esterification vessel, is esterified by using the esterification vessel, is subsequently fed continuously into the polymerization vessel, and is polymerized to continuously produce the polyester resin, the concentration of the carboxyl terminal groups at the outlet of the esterification vessel to which the slurry is fed is preferably reduced so as to be in a range of the set value±0%, preferably in a range of the set value±9%, more preferably in a range of the set value±8%, and even more preferably in a range of the set value±6%. In the above-described range, preferably, fluctuation of the concentration of the carboxyl terminal groups of the oligomer at the final esterification vessel outlet can be reduced so as to be in a preferable range, thereby leading to stabilization of the subsequent polymerization and the quality of the obtained polyester resin. Meanwhile, although the lower limit is most preferably the set value±0% indicating that the concentration does not fluctuate, the concentration is preferably in a range of the set value±0.5% and more preferably in a range of the set value±1.0% from the viewpoint of cost performance. According thereto, even when the subsequent control for the esterification vessel is performed at a conventionally known fluctuation level, fluctuation of the concentration of the carboxyl terminal groups of the polyester oligomer fed in the polymerization step can be greatly reduced as a result.

Furthermore, in the esterification step, it is preferable that the concentration of the carboxyl terminal groups and the concentration of the hydroxyl terminal groups in the polyester oligomer are measured on line, and feedback thereof to the above-described slurry temperature control system is performed to enhance the control accuracy and stability.

Although a method for measuring the oligomer characteristics is not limited, the oligomer characteristics are preferably measured by using a near-infrared spectrophotometer. The measurement is preferably performed continuously in a portion in which the oligomer flows, for example, in the reaction vessel, the piping, or the like, by using a near-infrared spectrophotometer. The near-infrared spectrophotometer is not particularly limited as long as the near-infrared spectrophotometer can perform continuous measurement on line. For example, a commercially available product such as a product of NIRS systems (NIRECO CORPORATION), a BRAN+LUEBBE product, or a near-infrared on-line analyzer manufactured by Yokogawa Electric Corporation may be used, or the measurement may be performed by producing a device systematized for this purpose.

A detection cell of the near-infrared spectrophotometer needs to be disposed in a high temperature region, and needs to be designed for addressing this. In a case where the detection cell is disposed between esterification vessels, the detection cell needs to have a structure resistant to a pressurized state. In a case where the detection sell is disposed in a transfer line from an esterification vessel to an initial polymerization vessel, the detection cell needs to have a structure resistant to both a pressurized state and a pressure-reduced state. This is preferably addressed as appropriate according to an installation location or the like.

A measurement cell of the near-infrared spectrophotometer may be disposed at any location from the start of the esterification to a location immediately preceding the start of the polymerization. The measurement cell may be disposed in the esterification vessel or may be disposed in a transfer line of each reaction vessel. The measurement cell may be disposed directly in each reaction vessel or the transfer line, or a bypass line may be provided and the measurement cell may be disposed in the bypass line. It is preferable that, in a case where the measurement cell is disposed in the bypass line and detects the internal portion of the reaction vessel, a circulation line in which reaction contents circulate is disposed in the target reaction vessel, and the measurement cell is disposed in the circulation line. Since maintenance for the measurement cell disposed may be required, the measurement cell is preferably disposed in the bypass line. In the present invention, as described above, since the concentration of the carboxyl terminal groups of the oligomer at the first esterification vessel outlet is important, it is preferable that, for example, a bypass line is disposed in the transfer line from the first esterification vessel to a second esterification vessel, and a detector is disposed in the bypass line to perform measurement. Another detector may be disposed in a transfer line from the final esterification vessel to the first polymerization vessel, and characteristic values of the oligomer at both locations may be measured to enhance control accuracy. In the method in which a plurality of detectors are used to control esterification, feedback of control according to a measurement value measured by a detector disposed in the transfer line of the first esterification vessel outlet is preferably made to a temperature of the slurry to be fed to the first esterification vessel. Feedback of control according to a measurement value detected at another detection location may be made to another control system for changing esterification, for example, to an amount of esterification adjusting glycol to be fed to the second esterification vessel. The control system that can maximize accuracy may be selected as appropriate to perform the control.

As the oligomer characteristics, only the concentration of carboxyl terminal groups may be measured, or both the concentration of carboxyl terminal groups and the concentration of the hydroxyl terminal groups may be simultaneously measured. Alternatively, in a case where the measurement is performed at a plurality of locations, a content to be measured may be changed at each location. For example, it is preferable that the control system according to the detector disposed in the transfer line of the first esterification vessel outlet performs control with the concentration of carboxyl terminal groups, and the control system according to the detector disposed in the transfer line of the final esterification vessel outlet measures both the concentration of carboxyl terminal groups and the concentration of hydroxyl terminal groups simultaneously to perform control such that both of the concentrations of the terminal groups are in predetermined ranges. The measurement wavelength of a near infrared ray is not limited. Preferably, a wavelength at which the sensitivity is high and disturbance is little is examined by using a model oligomer corresponding to the measurement location, and the wavelength is set as appropriate. For example, in the case of the concentration of carboxyl terminal groups, the wavelength of 1444 nm is preferably used, and, in the case of the concentration of hydroxyl terminal groups, the wavelength of 2030 nm is preferably used.

Calibration curves of both the terminal group concentrations quantified in the above-described method are preferably generated by using the above-described model oligomer. In this case, as the concentration of carboxyl terminal groups and the concentration of hydroxyl terminal groups in the model oligomer, values measured by the NMR method are preferably used.

In the polymerization step of the present invention, the number and the sizes of the reaction vessels, and the production condition and the like in each step can be selected as appropriate without limitations.

For example, in the case of a three-stage mode including an initial-stage polymerization, an intermediate-stage polymerization, and a late-stage polymerization, the polymerization condition is such that a reaction temperature is 250 to 290° C. and preferably 260 to 280° C., and the pressure is 2.6 to 65 kPa and preferably 4 to 27 kPa in the first-stage polymerization, and the temperature is 265 to 300° C. and preferably 265 to 290° C., and the pressure is 0.013 to 1.3 kPa and preferably 0.065 to 0.65 kPa in the final-stage polymerization. In a case where the three or more stages are provided, the reaction condition of the intermediate-stage polymerization is a condition between the reaction condition in the first stage and the reaction condition in the final stage. Degrees of enhancement of limiting viscosities achieved in the respective polymerization steps are preferably smoothly distributed.

(Addition of Polymerization Catalyst for Polyester Resin)

In the present invention, a method for adding the aluminium compound solution and the phosphorus compound solution, and locations at which the aluminium compound solution and the phosphorus compound solution are added are not limited. The aluminium compound solution and the phosphorus compound solution are preferably added simultaneously. Examples of simultaneous addition include a method in which each of the aluminium compound solution and the phosphorus compound solution is independently added at the same reaction vessel or the piping between the reaction vessels, and a method in which the aluminium compound solution and the phosphorus compound solution are previously mixed into one liquid and added as the one liquid. Examples of the method for making the solutions into one liquid include a method in which the respective solutions are mixed in a tank, and a method in which the respective solutions are joined and mixed in the middle of a pipe for adding the catalyst. In the case of addition to a reaction vessel, it is preferable to increase stirring of the reaction vessel. In the case of addition to a pipe between reaction vessels, it is preferable to install an in-line mixer or the like to quickly and uniformly mix the added catalyst solutions.

When the aluminium compound solution and the phosphorus compound solution are added separately, a large amount of foreign matter due to the aluminum compound is likely to occur, so that the temperature-rise crystallization temperature decreases, the temperature-decrease crystallization temperature increases, or sufficient catalytic activity is not achieved, in some cases. By adding the aluminum compound and the phosphorus compound at the same time, a complex of the aluminum compound and the phosphorus compound which provides polymerization activity can be quickly and efficiently formed. However, when the aluminum compound and the phosphorus compound are added separately, the formation of the complex of the aluminum compound and the phosphorus compound is insufficient, and the aluminum compound that has not formed a complex with the phosphorus compound may be deposited as foreign matter.

Furthermore, the aluminium compound solution and the phosphorus compound solution are preferably added after the esterification or transesterification has ended. If the aluminium compound solution and the phosphorus compound solution are added before the esterification or transesterification ends, an amount of aluminium-based foreign substances may be increased.

(Solid Phase Polymerization Step for Polyester Resin)

In the present invention, in a method for reducing an amount of CT, the polyester resin produced in the melt-polymerization step is preferably polymerized additionally in the solid phase polymerization step. The solid phase polymerization is performed by forming the polyester obtained in the melt-polymerization step into a powdery form. The powdery form represents polyester in the form of chips, pellets, flakes, or powder. The powdery form preferably represents chips or pellets, and the average particle diameter is generally 2.0 to 5.5 mm and preferably 2.2 to 4.0 mm.

In the solid phase polymerization, the powdery polyester is heated at a temperature of not higher than the melting point of polyester in a state where inert gas flows or pressure is reduced. The solid phase polymerization step includes at least one stage, and the polymerization temperature is generally 190 to 235° C. and preferably 195 to 230° C. In the method in which inert gas flows, the solid phase polymerization is performed under a condition that the pressure is generally 0.98 MPa to 0.0013 MPa and preferably 0.49 MPa to 0.013 MPa, in a state where inert gas such as nitrogen, argon, or carbon dioxide flows. In the method in which pressure is reduced, the solid phase polymerization is performed under a condition that the pressure is generally 13 to 39000 Pa and preferably 13 to 13300 Pa. Although the higher the temperature is, the shorter the time for obtaining desired physical properties is, the time for the solid phase polymerization is generally 1 to 50 hours, preferably 5 to 30 hours, and even more preferably 10 to 25 hours.

The powdery polyester to be fed in the solid phase polymerization step may be previously heated to a temperature lower than a temperature for the solid phase polymerization and preliminarily crystallized, and thereafter fed in the solid phase polymerization step.

In such a preliminary crystallization step, the powdery polyester may be heated in a dry state, for one minute to four hours, generally to a temperature of 120 to 200° C. and preferably to a temperature of 130 to 180° C. Alternatively, the powdery polyester may be heated for one minute or longer to a temperature of 120 to 200° C. in general, in a water vapor atmosphere, a water vapor-containing inert gas atmosphere, or a water vapor-containing air atmosphere.

The melt-polymerized polyester as described above is, for example, formed into chips and thereafter transported to a storage silo or the solid phase polymerization step through the transportation piping. If such transportation of the chips is, for example, forcibly performed in a low density transportation method using air, a high impact force is applied to the surfaces of the melt-polymerized polyester chips due to collision with the piping, resulting in generation of a large amount of fine or film-like objects. Such fine and film-like objects have an effect of promoting crystallization of polyester. In a case where a large amount of the fine and film-like objects are present, transparency of the obtained molded product becomes very poor. Therefore, addition of a step of removing such fine and film-like objects is one of preferable embodiments.

Although the method for removing the fine and the film-like objects is not limited, for example, a vibration sieving step, an airflow classification step using air flow, and a gravity classification step are separately provided in an intermediate step between the solid phase polymerization step and a post-treatment step after the solid phase polymerization step to perform the removal process.

The polyester obtained by the production method of the present invention may be brought into contact with water after the solid phase polymerization in order to further prevent, for example, the mold from becoming dirty due to oligomers such as cyclic trimers being adhered to an inner surface of the mold, a gas exhaust outlet of the mold, an exhaust pipe, or the like during molding. Although this method is not limited, examples of the method include a method of immersing the polyester in water or a method of pouring water onto the chips by using a shower. The treatment time is five minutes to two days, preferably 10 minutes to one day, and even more preferably 30 minutes to 10 hours, and the temperature of the water is 20 to 180° C., preferably 40 to 150° C., and even more preferably 50 to 120° C.

In the present invention, although the solid phase polymerization and the accompanying treatments described above may be performed in either a batch method or a continuous method, the continuous method is preferable from the viewpoint of uniformity in quality of the obtained polyester and economic efficiency.

In the present invention, although the degree of polymerization of the polyester may be set as appropriate according to the characteristics required for usage of the obtained polyester, it is preferable that polyester having an intrinsic viscosity of 0.3 to 0.65 dl/g is obtained in the melt-polymerization, and the intrinsic viscosity of the polyester obtained by the melt-polymerization is enhanced to 0.60 to 1.20 dl/g by the solid phase polymerization in general.

(Method for Producing Blow-Molded Product Made of Polyester Resin)

In the present invention, although a method for producing a blow-molded product made of the polyester resin is not limited, the blow-molded product is preferably produced by the following method.

In blow-molding for heat-resistant bottles, a precursor called a preform having a bottom is generated, and the preform is blow-stretched in a mold and further heat-set in general. For producing the preform, compression molding, injection molding, or the like is used. For example, in injection molding, heating and melting to 260 to 300° C. is performed and injection into a mold for a preform is performed, whereby a preform can be obtained. In general, the preform has a test-tube-like thick shape, has a gate portion at the bottom, and is screwed for a cap at a plug portion.

The plug portion of the obtained preform is crystallized for heat-resistant bottles. Due to the crystallization, even when high-temperature contents are filled, deformation of the plug portion can be prevented. The crystallization of the plug portion is performed by heating the plug portion preferably to 130 to 200° C. and more preferably to 140 to 190° C. As the heating method, a method using an infrared heater, hot air, induction heating, immersion in oil bath, or the like can be used, and an infrared heater is preferably used from the viewpoint of productivity and the like. The plug portion may be heated and crystallized after the blow-molding.

The preform is heated, and the preform is stretched in the bottle length direction (longitudinal direction) and blow-molded in the circumferential direction, to obtain a bottle. The preform is stretched in the length direction by using a bar-like stretching rod in general, and stretched in the circumferential direction by using pressurized gas such as air or nitrogen. The pressurized gas of 1 to 10 MPa is preferable. A method in which the pressurized gas is blown while the stretching rod is inserted, and the preform is stretched simultaneously in the length direction and the circumferential direction, is preferable. However, the preform may be stretched in the circumferential direction after the preform has been stretched in the length direction. For the heating, an infrared heater, hot air, induction heating, or the like is used. The heating temperature is generally 80 to 130° C. and preferably 90 to 120° C.

The lower limit of a stretch ratio in the bottle length direction is preferably 1.5 times and more preferably 2 times. In a case where the stretch ratio is less than this lower limit, the preform may be unevenly stretched. The upper limit of the stretch ratio in the length direction is preferably 6 times, more preferably 5 times, and even more preferably 4 times. In a case where the stretch ratio is larger than this upper limit, breakage or the like is likely to occur.

The lower limit of a stretch ratio in the bottle circumferential direction is preferably 2 times and more preferably 2.5 times. In a case where the stretch ratio is less than this lower limit, the preform may be unevenly stretched. The upper limit of a stretch ratio in the circumferential direction is preferably 6 times, more preferably 5 times, and even more preferably 4 times. In a case where the stretch ratio is larger than this upper limit, breakage or the like is likely to occur.

In a case where heat-setting is subsequently performed in the same mold after the blow-molding, the lower limit of the temperature of the mold in the blow-molding is preferably 80° C., more preferably 120° C., even more preferably 130° C., and most preferably 140° C. In a case where the temperature is lower than this lower limit, crystallization is not sufficiently promoted in the subsequent heat-setting and heat resistance may become insufficient, or a heat-setting time needs to be elongated and this may reduce productivity.

The upper limit of the temperature of the mold is preferably 200° C., more preferably 190° C., even more preferably 180° C., and particularly preferably 170° C. A high temperature of the mold increases dirt on the mold, and the number of times continuous molding can be performed may be reduced.

The bottle having been blow-molded is subsequently heat-set in the mold. The lower limit of the heat-setting time is preferably 0.5 seconds, more preferably one second, and even more preferably 1.5 seconds. In a case where the heat-setting time is less than this lower limit, crystallization is not sufficiently promoted, and heat resistance may become insufficient. The upper limit of the heat-setting time is 15 seconds, preferably 10 seconds, and more preferably 5 seconds. Long heat-setting time reduces productivity. Furthermore, in the case of a rotary blow-molding machine, multiple molds need to be disposed and increase of the size of the device may reduce economic efficiency. After the heat-setting in the mold, additional heat-setting may be further performed by heating using infrared rays, hot air, induction heating, or the like.

Furthermore, a method in which the blow-molding is performed in a mold set at 5 to 50° C., and heat-setting is subsequently performed in the heated mold, may also be used. In this case, the temperature of the mold for heat-setting is the same as the temperature of the mold for the above-described case.

The blow-molding device including a single mold can be used. For mass production, a system in which a plurality of molds are disposed, and these molds are sequentially moved to a location at which the heated preform is set in the mold, a location at which the preform is stretched, a location at which heat-setting is performed, and a location at which the bottle is discharged, is preferable.

A cold parison method in which the cooled preform is re-heated has been described above. However, a hot parison method in which blow-molding is performed without completely cooling the preform, can also be used.

A content amount of the molded bottle is preferably 200 mL to 6 L and particularly preferably 300 mL to 2 L. The bottle barrel portion may have any shape such as round, quadrangular (including a shape in which corner portions are cut), and hexagonal shapes.

The present application claims the benefit of priority to Japanese Patent Application No. 2020-056876 filed on Mar. 26, 2020. The entire contents of the specifications of Japanese Patent Application No. 2020-056876 filed on Mar. 26, 2020 are hereby incorporated by reference.

EXAMPLES

Hereinafter, the present invention will be specifically described by means of examples, but the present invention is not limited to these examples. The evaluation methods used in the examples and comparative examples are as follows.

[Evaluation Methods]

(1) Intrinsic Viscosity (IV) of Polyester Resin

The polyester resin was dissolved in a mixed solvent of phenol and 1,1,2,2-tetrachloroethane (=6/4; weight ratio) and measured at a temperature of 30° C.

(2) Quantification of the Total Amount of Phosphorus Element Bound to Hydroxyl Group Terminals of Polyester Relative to the Total Amount of Phosphorus Element in the Polyester Resin (2-1) P-NMR Spectrum Measurement In 2.7 mL of a hexafluoroisopropanol+deuterated benzene (1+1) mixed solvent, 420 mg of polyester resin was dissolved, and 10 μL of a phosphoric acid 25% deuterated acetone solution was added, and centrifugation was performed. Thereafter, 100 to 150 mg of trifluoroacetic acid was added to the supernatant liquid, and P-NMR measurement was immediately performed. The method for measuring an amount of the phosphorus compound bound to the polyester terminal groups was not limited to the same method as described above, and may be any method capable of checking peaks corresponding to the above-described chemical formula 1 to chemical formula 3 (hereinafter, referred to as "three kinds of phosphorus compounds bound to polyester terminal groups").

Device: Fourier-transform nuclear magnetic resonance system (manufactured by BRUKER, AVANCE500)
31P resonance frequency: 202.456 MHz
Lock solvent: deuterated benzene
Flip angle of detection pulse: 650
Data sampling interval: 1.5 seconds
Delay time: 0.5 seconds
Proton decoupling: full decoupling
Measurement temperature: 25 to 35° C.
The number of times for integration: about 20000 to 30000 times (2-2) Quantification Method In the spectrum obtained in the above-described (2-1), six peaks were observed at 27 to 38 ppm, and 0 to 3 peaks were observed at 50 to 55 ppm. Shift change was little at three peaks for the corresponding three kinds of phosphorus compounds bound to polyester terminal groups among the peaks appearing at 27 to 38 ppm even when an amount of trifluoroacetic acid was changed by about 10 to 20% in the above-described range of the added amount, as compared with the other three peaks that did not correspond to the three kinds of phosphorus compounds bound to polyester terminal groups, and the chemical shift value was 28.8±0.3 ppm at the first peak, 30.1±0.3 ppm at the second peak, and 30.5±0.3 ppm at the third peak. A shift difference between the first peak and the second peak was 1.3±0.1 ppm, and a shift difference between the second peak and the third peak was 0.4±0.1 ppm. A ratio of the peak integration value of each of the three peaks to the total of peak integration values corresponding to the entire phosphorus compound was obtained. The ratios are indicated as a, b, and c in Table 4. The total value of a to c was set as an amount of the phosphorus compounds bound to polyester terminals (the total amount of phosphorus element contained in the three kinds of phosphorus compounds bound to polyester terminal groups relative to the total amount of the phosphorus element in the polyester resin).

(3) Quantification of Aluminium Element in Polyester Resin (Dry Degradation Method)

Polyester resin was weighted in a platinum crucible, and carbonized in an electric stove, and thereafter incinerated in a muffle furnace under the condition of 550° C./eight hours. The incinerated sample was subjected to acid treatment with 6 M hydrochloric acid, and the volume was thereafter fixed to 20 mL with 1.2 M hydrochloric acid.

The metal concentration was determined by ICP emission measurement.

Device: CIROS-120 manufactured by SPECTRO
Plasma output: 1400 W
Plasma gas: 13.0 L/min
Auxiliary gas: 2.0 L/min
Nebulizer: cross flow nebulizer
Chamber: cyclone chamber
Measurement wavelength; 167.078 nm (4) Quantification of Phosphorus Element in Polyester Resin (Molybdenum Blue Colorimetric Method)

The polyester resin was subjected to wet degradation with sulfuric acid, nitric acid, and perchloric acid, and thereafter neutralized by aqueous ammonia. Ammonium molybdate and hydrazine sulfate were added to the prepared solution, and an absorbance at a wavelength of 830 nm was thereafter measured by using an ultraviolet-visible light spectrophotometer (manufactured by SHIMADZU CORPORATION, UV-1700).

(5) Aluminum-Based Foreign Matter Amount 30 g of the polyester resin and 250 mL of a p-chlorophenol/tetrachloroethane (3/1: weight ratio) mixed solution were put in a 500 mL Erlenmeyer flask containing a stirrer, and heated and dissolved at 100 to 105° C. for 1.5 hours using a hot stirrer. The solution was filtered to separate foreign matter using a membrane filter made of polytetrafluoroethylene and having a diameter of 47 mm and a pore size of 1.0 μm (PTFE membrane filter manufactured by Advantec, product name: T100A047A). The effective filtration diameter was 37.5 mm. After the completion of filtration, washing was subsequently performed using 50 mL of chloroform, and then the filter was dried.

The amount of aluminum element was quantified on the filtration surface of the membrane filter with a scanning fluorescent X-ray analyzer (ZSX100e, Rh line bulb: 4.0 kW, manufactured by RIGAKU). The quantification was performed on a central portion of the membrane filter having a diameter of 30 mm. A calibration curve of the fluorescent X-ray analysis method was obtained using a polyethylene terephthalate resin having a known aluminum element content, and the apparent amount of aluminum element was indicated in ppm. The measurement was carried out by measuring the Al-Kα ray intensity under the conditions of PHA (pulse height analyzer) 100-300 using pentaerythritol as a spectroscopic crystal and a PC (proportional counter) as a detector at an X-ray output of 50 kV-70 mA. The amount of aluminum element in the PET resin for the calibration curve was quantified by high-frequency inductively coupled plasma emission spectrometry.

(6) Quantification of CT and ΔCT

The polyester resin having been subjected to solid phase polymerization or a blow-molded product made of the polyester resin and molded by a method described below was freeze-ground or shredded, and 100 mg of a sample was accurately weighed. The sample was dissolved in 3 mL of a hexafluoroisopropanol/chloroform mixture (volume ratio=2/3), and 20 mL of chloroform was further added to dilute the sample. To the obtained product, 10 mL of methanol was added to precipitate polymer and filtration was thereafter performed. The filtrate was evaporated, dried, and solidified to fix the volume with 10 mL of dimethylformamide. Subsequently, cyclic trimers were quantified by the following high-speed liquid chromatography.

The amount of CT represents an amount of cyclic trimers in the polyester resin having been subjected to solid phase polymerization. The amount of ΔCT represents a value obtained by subtracting an amount of cyclic trimers in the polyester resin having been subjected to solid phase polymerization from an amount of cyclic trimers in a blow-molded product made of the polyester resin. The total amount of CT (=amount of CT+amount of ΔCT) represents an amount of cyclic trimers in the blow-molded product made of the polyester resin.

Device: L-7000 (manufactured by Hitachi, Ltd.)

Column: μ-Bondasphere C18 5μ 100 angstrom 3.9 mm×15 cm (manufactured by Waters)

Solvent: eluent A: 2% acetic acid/water (v/v)

Eluent B: acetonitrile

Gradient B %: 10→100% (0→55 minutes)

Flow rate: 0.8 ml/minute

Temperature: 30° C.

Detector: UV-259 nm (7) Preparation of Aluminium Compound

In a preparation tank, a 20 g/L aqueous solution of basic aluminium acetate and an equivalent amount (volume ratio) of ethylene glycol were charged, and were stirred at room temperature for several hours, and water was thereafter distilled from a system while the obtained product was stirred at 50 to 90° C. in a pressure-reduced state (3 kPa) for several hours, to prepare an ethylene glycol solution containing 20 g/L of aluminium compound.

(8) Preparation of Phosphorus Compound

Irganox1222 (manufactured by BASF) as the phosphorus compound, and ethylene glycol were charged in a preparation tank, and heated at a liquid temperature of 175° C. for 2.5 hours while being stirred under nitrogen substitution, to prepare an ethylene glycol solution containing 50 g/L of the phosphorus compound. A molar fraction of the phosphorus compound represented by chemical formula 4 in the obtained solution was 40%, and a molar fraction of a compound having a structure changed from chemical formula 4 was 60%.

Examples 1, 2 and Comparative Examples 1, 2

(Melt-Polymerization Step)

To a continuous polyester producing device including three continuous esterification vessels and three polycondensation vessels and having an in-line mixer having a high speed stirrer in a transfer line from the third esterification vessel to the first polycondensation vessel, slurry prepared by mixing 0.75 parts by mass of ethylene glycol with 1 part by mass of high-purity terephthalic acid was continuously fed, and was caused to react at temperatures, pressures, and residence times indicated in Table 3, to obtain low-order condensate. The low-order condensate was continuously transferred to a continuous polycondensation device including three reaction vessels, and was subjected to polycondensation at temperatures, pressures, and residence times indicated in Table 3, to obtain polyester resin (PET) having an IV of 0.554 dl/g. The polyester resin was extruded into strands, and cooled in water, and was then cut, to obtain chips having an average particle weight of 23.5 mg. The polyester resin was collected when 30 hours or longer elapsed after start of operation or after change of condition, in order to eliminate influence of the batch and ensure high quality products.

Through the in-line mixer, the ethylene glycol solution containing 20 g/L of the aluminium compound, which was prepared by the above-described method, and the ethylene glycol solution containing 50 g/L of the phosphorus compound, which was prepared by the above-described method, were added such that the remaining amount after end of the polymerization was an amount indicated in Table 4 with respect to the mass of the obtained polyester resin.

TABLE 3

| | Item | Example 1 | Example 2 | Comparative Example 1 | Comparative Example 2 |
|---|---|---|---|---|---|
| First esterification vessel | Temperature (° C.) | 255 | 255 | 255 | 255 |
| | Pressure (kPa) | 160 | 126 | 170 | 126 |
| | Residence time (hr) | 3.0 | 4.5 | 3.0 | 4.5 |
| Second esterification vessel | Temperature (° C.) | 261 | 260 | 261 | 260 |
| | Pressure (kPa) | 102 | 102 | 102 | 102 |
| | Residence time (hr) | 1.0 | 1.2 | 1.0 | 1.2 |
| Third esterification vessel | Temperature (° C.) | 267 | 266 | 267 | 266 |
| | Pressure (kPa) | 110 | 126 | 109 | 126 |
| | Residence time (hr) | 0.5 | 0.8 | 0.5 | 0.8 |
| First polymerization vessel | Temperature (° C.) | 268 | 268 | 275 | 268 |
| | Pressure (kPa) | 4.7 | 5.3 | 4.7 | 5.3 |
| | Residence time (hr) | 1.8 | 1.4 | 1.8 | 1.4 |
| Second polymerization vessel | Temperature (° C.) | 271 | 270 | 278 | 270 |
| | Pressure (kPa) | 1.0 | 0.9 | 1.4 | 0.9 |
| | Residence time (hr) | 0.7 | 1.0 | 0.7 | 1.0 |
| Third polymerization vessel | Temperature (° C.) | 274 | 270 | 282 | 273 |
| | Pressure (kPa) | 0.2 | 0.3 | 0.2 | 0.3 |
| | Residence time (hr) | 0.7 | 1.2 | 0.7 | 1.0 |

(Solid Phase Polymerization Step)

Subsequently, the obtained chips were transported to a continuous solid phase polymerization device. The chips were crystallized at about 155° C. in a nitrogen atmosphere, further preheated to about 200° C. in a nitrogen atmosphere, thereafter sent to a continuous solid phase polymerization vessel, and was subjected to solid phase polymerization at about 207° C. in a nitrogen atmosphere. Subsequently, the obtained product was treated in a vibration sieving step and an airflow classification step to remove fine and film-like objects, and polyester resin having an IV of 0.735 dl/g was obtained.

(Method for Producing Blow-Molded Product Made of the Polyester Resin)

The polyester resin was dried in a vacuum dryer such that a moisture content was not larger than 100 ppm, and a preform having a bottom was molded by using an M-150C-DM type injection molding machine manufactured by MEIKI CO., LTD. and a mold (mold temperature of 5° C.) for preforms. The plasticization condition by the M-150C-DM injection molding machine was set such that the number of revolutions of a feed screw was 70%, the number of revolutions of a screw was 120 rpm, a back pressure was 0.5

MPa, the cylinder temperatures were 45° C. and 250° C. in order starting from a temperature immediately below a hopper, and temperatures of subsequent cylinders including a nozzle were 290° C. The injection pressure and holding pressure were adjusted such that the weight of the molded product was 28.4±0.2 g.

Subsequently, the plug portion of the preform was heated and crystallized by using an NC-01 plug portion crystallizing device manufactured by Frontier, Inc. Furthermore, by using an SBO LabN° 1045 type 1 Lab blow-molding machine manufactured by Sidel, the above-described preform was subjected to biaxial stretching blow molding at 2.5 times in the longitudinal direction, 3.8 times in the circumferential direction, and 750 bph in a molding cycle of 30 seconds while air having a pressure of 36 bar was blown into a mold set to 160° C.

The conditions of the final melt-polymerization vessel (third polymerization vessel) for the polyester resins of Examples 1, 2 and Comparative examples 1, 2, and the characteristics values of the blow-molded products made of the polyester resins are indicated in Table 4.

blow-molding step because the temperature of the solid phase polymerization step was low and a residence time was extremely short in the blow-molding step.

In the polyester resin and the blow-molded product made of the polyester resin according to Examples 1, 2, the amount of CT and the total amount of CT (amount of CT+amount of ΔCT) were small, and the quality was higher than the quality of the polyester resin and the blow-molded product made of the polyester resin according to Comparative Examples 1, 2.

FIG. 1 shows a relationship between T*RT*(P/Al), and CT and ΔCT, FIG. 2 shows a relationship between T*RT*(P/Al) and the total amount of CT (amount of CT+amount of ΔCT). FIG. 3 shows a relationship between T*RT*(P/Al) and an amount of the terminal-blocking phosphorus compound, FIG. 4 shows a relationship between an amount of the terminal-blocking phosphorus compound and the total amount of CT (amount of CT+amount of ΔCT), and FIG. 5 shows a relationship between an amount of the terminal-blocking phosphorus compound and a speed of the solid phase polymerization, according to the results of the Examples and the Comparative Examples in Table 4.

TABLE 4

| Item | | Example 1 | Example 2 | Comparative Example 1 | Comparative Example 2 |
|---|---|---|---|---|---|
| Condition of final polymerization vessel | T (° C.) | 274 | 270 | 282 | 273 |
| | RT (hr) | 0.7 | 1.2 | 0.7 | 1.0 |
| | T*RT (° C. · hr) | 191 | 324 | 197 | 273 |
| Amount of remaining metal | Al (ppm) | 19 | 19 | 15 | 19 |
| | P (ppm) | 49 | 34 | 52 | 49 |
| | P/Al (molar ratio) | 2.2 | 1.6 | 3.0 | 2.2 |
| Amount of phosphorus element bound to polyester terminals (mol %) | a | 26.5 | 26.5 | 20.3 | 17.8 |
| | b | 10.3 | 12.1 | 11.7 | 6.8 |
| | c | 7.5 | 7.6 | 9.6 | 8.5 |
| | (a + b + c)/total | 44.3 | 46.2 | 41.6 | 33.1 |
| T*RT*(P/Al) | | 420 | 518 | 591 | 601 |
| Amount of aluminum-based foreign matter (ppm) | | 390 | 480 | 300 | 390 |
| A speed of solid phase polymerization (ΔIV/hr) | | 0.0060 | 0.0067 | 0.0057 | 0.0046 |
| A time for solid phase polymerization (hr) | | 17 | 15 | 18 | 20 |
| CT (ppm) | | 2950 | 3070 | 3400 | 3510 |
| ΔCT (ppm) | | 620 | 300 | 250 | 280 |
| CT + ΔCT (ppm) | | 3570 | 8370 | 3650 | 3790 |

In Table 4, an amount of CT represents a measured value of the cyclic trimers contained in the solid-phase polymerized product of polyester resin, and the total amount of CT (=amount of CT+amount of ΔCT) represents a measured value of the cyclic trimers contained in the blow-molded product made of the polyester resin. An amount of aluminum-based foreign substances and an amount of the terminal-blocking phosphorus compound each represent a value measured from the polyester resin obtained in the multi-polymerisation step. Each of the amount of aluminum-based foreign substances and the amount of the terminal-blocking phosphorus compound hardly changed in the solid phase polymerization process and blow-molding evaluation. Therefore, the solid-phase-polymerized product of the polyester resin and the blow-molded product made of the polyester resin were regarded as having substantially the same values as the measured values in Table 4. It is considered that the amount of aluminium-based foreign substances and the amount of the terminal-blocking phosphorus compound did not change in the solid phase polymerization and the According to the drawings, it is clear that the scope of the claim of the present invention was critical. Furthermore, it is clear that an amount of CT and an amount of ΔCT are antinomical.

INDUSTRIAL APPLICABILITY

The present invention is directed to a method for producing polyester resin, and the polymerization catalyst that is formed of the aluminium compound and the phosphorus compound and that has, as a main metal component of the catalyst, a metal component other than antimony element, germanium element, and titanium element, is used. Various stabilities of hue, heat resistance, and the like as characteristics of polyester resin obtained by using the polymerization catalyst are exhibited, and, furthermore, an amount of generated aluminium-based foreign substances is reduced and transparency is made high. Moreover, since a part of hydroxyl group terminals of the polyester resin is blocked by the phosphorus compound, generation of CT and ΔCT is inhibited in the step of producing the polyester resin and the molding step of blow-molding the polyester resin, and an effect of inhibiting a mold for molding from becoming dirty is exhibited, and, furthermore, a speed for solid phase polymerization can be enhanced. Therefore, contribution to the industry is large.

The invention claimed is:

1. A method for producing polyester resin containing an ethylene terephthalate structural unit of not less than 85 mol %, the method comprising:

a melt-polymerization step of continuously performing melt-polymerization by using an aluminium compound and a phosphorus compound as a polymerization catalyst in two or more polymerization vessels including a final polymerization vessel; and a solid phase polymerization step of performing solid phase polymerization after the melt-polymerization step, wherein the melt-polymerization step includes a final melt-polymerization step performed in the final polymerization vessel, and the final melt-polymerization step satisfies a condition represented by formula (I):

$$410 \leq T^*RT^*(P/Al) \leq 580 \quad (I),$$

wherein T represents a temperature (° C.) in the final melt-polymerization step, RT represents residence time (hour) in the final melt-polymerization step, and P/Al represents a molar ratio of phosphorus element to aluminium element in the polyester resin.

2. The method for producing polyester resin according to claim 1, wherein the phosphorus compound is a phosphorus compound heated in a solvent at 150 to 200° C.

3. The method for producing polyester resin according to claim 1, wherein the phosphorus compound is at least one selected from the group consisting of a phosphonic acid-based compound and a phosphinic acid-based compound.

4. The method for producing polyester resin according to claim 1, wherein a total amount of phosphorus element bound to a hydroxyl group terminal of polyester relative to a total amount of phosphorus element in the polyester resin, is 42 to 60 mol %.

5. The method for producing polyester resin according to claim 1, wherein an amount of a cyclic trimer of the polyester resin is not larger than 3300 ppm.

6. The method for producing polyester resin according to claim 1, wherein an amount of a cyclic trimer (ΔCT) contained in a sample is not larger than 650 ppm, and the sample is prepared by subjecting the polyester resin having a moisture content of not larger than 100 ppm to melt-molding using an injection molding machine at a cylinder temperature of 290° C.

7. The method for producing polyester resin according to claim 1, wherein a structure of the phosphorus compound bound to a hydroxyl group terminal of the polyester resin is at least one of structures represented by chemical formula 1 to chemical formula 3:

chemical formula 1

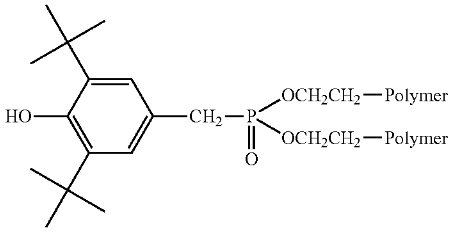

chemical formula 2

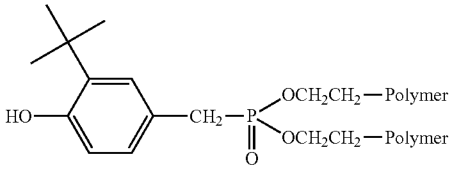

chemical formula 3

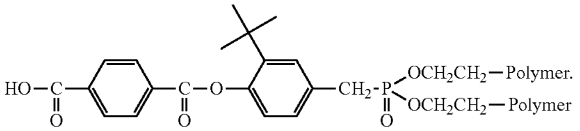

8. The method for producing polyester resin according to claim 1, wherein a content of aluminium element in the polyester resin is 13 to 25 ppm.

9. The method for producing polyester resin according to claim 1, wherein a molar ratio (P/Al) of phosphorus element to aluminium element in the polyester resin is 1.5 to 3.5.

10. A method for producing a blow-molded product made of polyester resin, the method comprising performing blow-molding of the polyester resin produced in the method for producing polyester resin according to claim 1.

11. The method for producing polyester resin according to claim 1, wherein the solid phase polymerization is performed under a polymerization temperature of 190 to 235° C. and a polymerization time of 5 to 30 hours.

* * * * *